United States Patent [19]

Cummings

[11] 4,006,835
[45] Feb. 8, 1977

[54] CONVERTIBLE STOPPER FOR A WIDE MOUTH THERMOS

[75] Inventor: John S. Cummings, Nashville, Tenn.

[73] Assignee: Aladdin Industries, Incorporated, Chicago, Ill.

[22] Filed: Jan. 22, 1976

[21] Appl. No.: 651,458

Related U.S. Application Data

[63] Continuation of Ser. No. 446,694, Feb. 28, 1974, abandoned.

[52] U.S. Cl. .............................................. 215/13 R
[51] Int. Cl.² ......................................... A47J 41/00
[58] Field of Search .......... 215/13, 12, 307; 220/1, 220/9 R, 9 F, 9 E, 9 B

[56] References Cited

UNITED STATES PATENTS

| 658,382 | 9/1900 | Low | 215/307 |
|---|---|---|---|
| 658,383 | 9/1900 | Low | 215/307 |
| 660,435 | 10/1900 | Hilgenberg | 215/307 |
| 2,385,847 | 10/1945 | Skar | 215/13 R |
| 2,788,149 | 4/1957 | Brown | 215/13 R |
| 3,016,159 | 1/1962 | Bramming | 215/307 |
| 3,298,554 | 1/1967 | Piker | 220/9 F |
| 3,438,116 | 4/1969 | Stengle | 215/307 |

FOREIGN PATENTS OR APPLICATIONS

| 620,624 | 4/1927 | France | 215/307 |
|---|---|---|---|
| 1,513,021 | 3/1967 | France | 215/13 R |

Primary Examiner—Ro E. Hart
Attorney, Agent, or Firm—McDougall, Hersh & Scott

[57] ABSTRACT

A thermos bottle utilizing a wide opening vacuum filler is disclosed. The thermos is provided with a compound stopper removably engaging the thermos for converting the wide mouth thermos to a narrow mouth configuration.

5 Claims, 2 Drawing Figures

CONVERTIBLE STOPPER FOR A WIDE MOUTH THERMOS

This is a continuation, of application Ser. No. 446,694 filed Feb. 28, 1974 now abandon.

BACKGROUND OF THE INVENTION

The present invention relates to the field of containers for maintaining liquids and solid materials such as food at a substantially constant temperature over a relatively long period of time. One highly successful device for accomplishing this objective is a Dewar flask or thermos bottle. Such a container employs a double wall filler which may be made of metal, or glass and from which air is substantially evacuated.

It is known in the prior art to provide relatively narrow mouth thermos bottles which are well adapted for storing and pouring liquids and which utilize a tall and relatively small diameter vacuum filler.

Wide mouth thermos bottles employ a vacuum filler of a larger diameter and have a protective liner which closely conforms to the internal wall of the wide mouth filler. A wide mouth thermos, while being well suited to the storing and dispensing of solid and semi-solid foods such as soups has the disadvantage of a lower thermal insulating capability than the narrow mouth design. Further, liquids are more difficult to pour without spilling.

It is accordingly an object of the present invention to obtain the benefits of a wide mouth thermos design and the advantages of a narrow mouth thermos.

It is another object of the present invention to provide a thermos which uses a wide opening vacuum filler but has the pouring characteristics of a narrow mouth thermos.

It is a further object of the present invention to provide a lined, wide mouth thermos with a stopper having a narrow pouring opening.

It is another object of the present invention to provide a compound stopper which is capable of converting a wide mouth thermos bottle into a narrow mouth thermos bottle so that the benefits of each design can be obtained.

It is yet another object of the present invention to provide a thermos bottle which can be used as either a wide mouth thermos bottle or a narrow mouth thermos bottle as desired.

Other objects of the present invention will become apparent from the remaining portion of the specification.

SUMMARY OF THE INVENTION

A compound stopper for a wide mouth thermos bottle serves to convert a wide mouth thermos to a narrow mouth thermos. The stopper comprises a convertible stopper which removably engages the thermos to form the narrow mouth opening to the lined interior and a narrow stopper adapted to threadingly engage the convertible stopper for sealing the thermos. The thermos can be utilized as a wide mouth thermos bottle, as a narrow mouth thermos bottle, or can be used as a combination of both, as, for example, loading iced drinks through the wide mouth and pouring through the narrow mouth.

DETAILED DESCRIPTION

Figure 1:
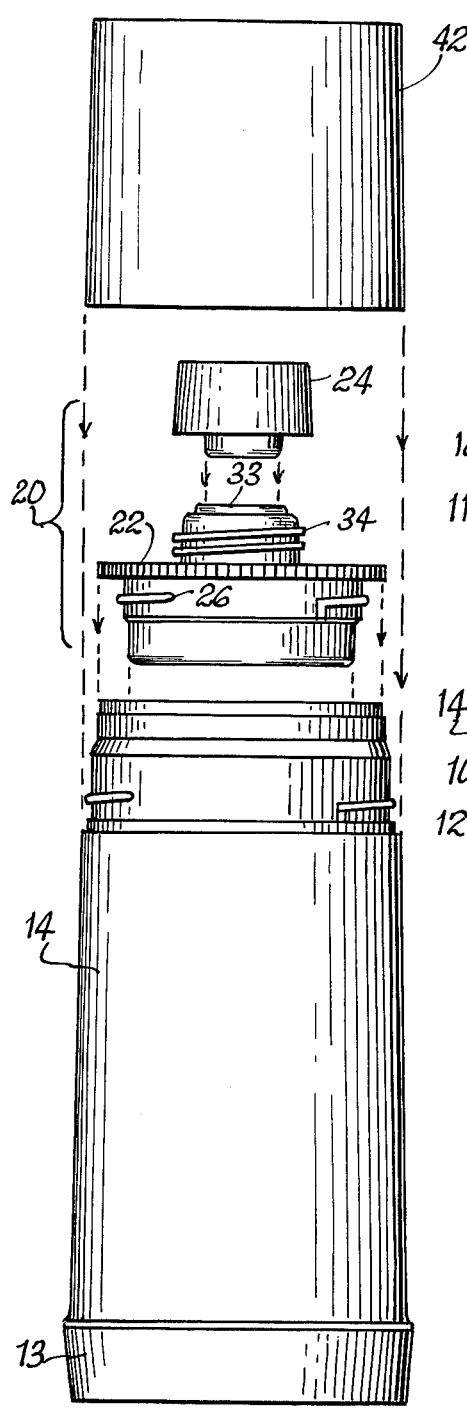
FIG. 1 is a side view of a thermos with a wide mouth vacuum filler and the compound stopper of the present invention.
Figure 2:
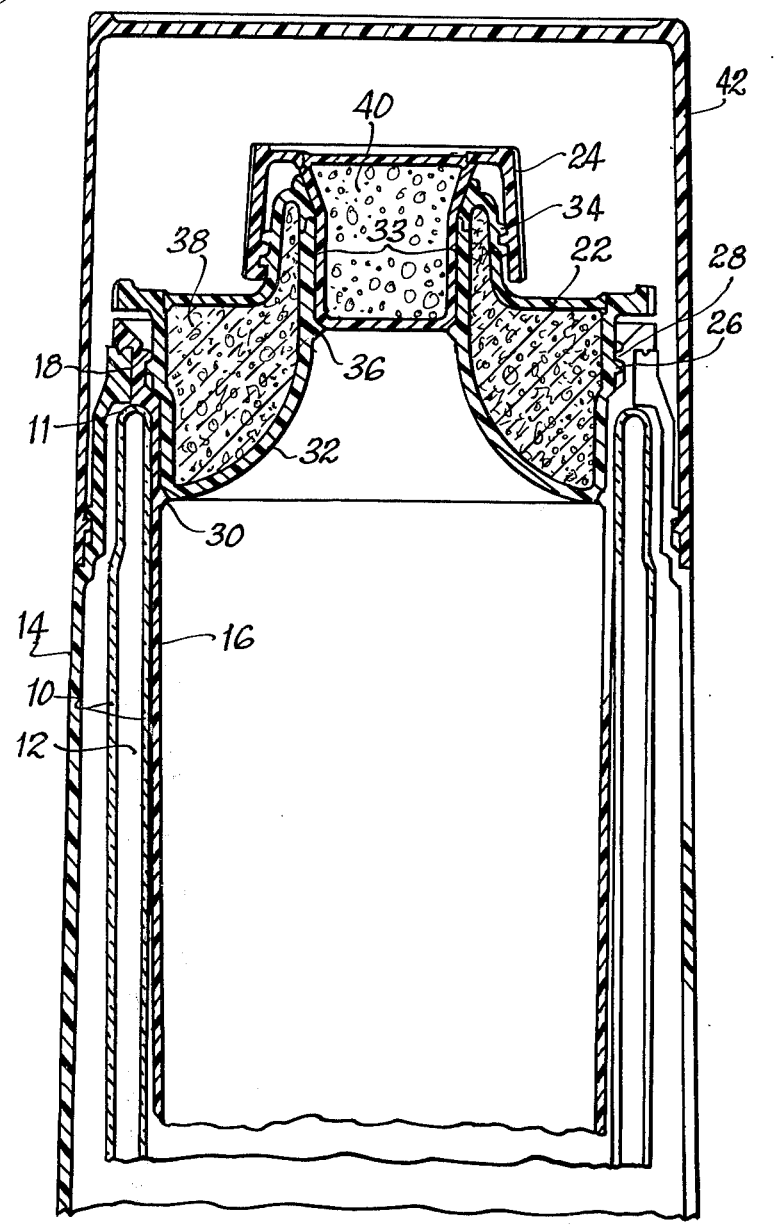
FIG. 2 is an enlarged longitudinal cross section of a portion of the thermos showing the details of the compound stopper.

Referring now to the figures, a thermos including the compound stopper according to the present invention is illustrated. The thermos includes a vacuum filler 10 of conventional construction having a wide opening 11 to its interior. The filler is preferably a double wall glass envelope having air evacuated from the space 12 between the walls. The filler is supported on a base 13 in a conventional manner. Surrounding the vacuum filler is a protective jacket 14. The base 13 may be integral with this jacket or may be threadingly engaged thereon. Disposed within the insulating interior of the vacuum filler 10 is a protective liner 16. The liner conforms to the inner wall of the filler and is thin walled to reduce conductive heat loss. It may be formed from any desired material having suitable heat characteristics and which is safe for use with foods. Preferred materials include:

| | | |
|---|---|---|
| Polypropylene | ABS | Acetal |
| Polycarbonate | Modified PPO | Nylon |
| Polysulphone | HDPE | Polybutylene Therathalate |

The liner may be formed by injection blow molding, or any other suitable plastic molding technique, so that it closely conforms to the glass filler. The liner, however, should not be so snug against the filler that thermal expansion thereof causes excessive stress on the filler or buckling of the liner.

The jacket 14 and the liner 16 are joined together at a location 18 just above the opening 11 to the interior of the vacuum filler. The liner and jacket may be heat welded or adhesively bonded as desired. This closure prevents moisture and dirt from getting into the space between the jacket and liner.

The compound stopper 20 of the present invention comprises a convertible stopper 22 and a narrow mouth stopper 24. The convertible stopper 22 has external threads 26 thereon adapted to engage internal threads 28 formed on the liner 16 near the point where it is attached to the jacket. When the convertible stopper 22 is threaded fully onto the jacket, it seats against a projecting rim 30 of the liner to securely seal the lined interior near the opening 11.

The convertible stopper has a tapered interior surface 32 which rises to form a cylindrical narrow mouth opening 33. When the convertible stopper is in place, the wide mouth thermos is converted to a narrow mouth thermos. In order to seal the narrow mouth opening 33, narrow mouth stopper 24 is threaded onto external threads 34 of the convertible stopper. A rib 36 protruding from the opening 33 insures a good seal with the narrow mouth stopper.

The thermal insulating properties of the thermos can be improved according to the present invention by providing heat insulating material in the torroidal cavity 38 of the convertible stopper and in the cylindrical cavity 40 of the narrow mouth stopper. The heat insulating material may be of any suitable material such as powdered cork.

As thus far described, it will be apparent that by selectively using the compound stopper 20 of the present invention the thermos may be used as a lined wide mouth thermos, as a lined narrow mouth thermos, or as a combination of both. That is, for solid and semi-solid foods such as soups, the thermos can be used in the same manner as a standard wide mouth thermos. This is accomplished by removing and replacing the convertible stopper 22 and the narrow mouth stopper 24 as a unit.

When it is desired to utilize the thermos as a narrow mouth thermos, the convertible stopper 22 is kept on the thermos assembly and only the narrow mouth stopper 24 is removed and replaced for pouring and storing, respectively. Finally, it will be apparent that a combination obtaining the benefits of both thermos designs is possible. For example, where iced drinks such as tea are to be stored in the thermos, the tea, as well as ice cubes can be easily loaded into the thermos by removing the entire compound stopper assembly. When it is desired to pour the tea it is necessary to remove only the narrow mouth stopper 24. Removal of the narrow mouth stopper 24 restricts the passage of ice cubes but permits the easy pouring of the liquid and minimizes the possibility of spilling.

As is well known in the art, the thermos is provided with a combination cup and cover 42 which threadingly engages the protective jacket. The cup 42 is of conventional design although it is desirable to increase its height to more easily accommodate the increased height of the compound stopper 20.

While I have shown and described embodiments of this invention in some detail, it will be understood that this description and illustrations are offered merely by way of example, and that the invention is to be limited in scope only by the appended claims.

I claim:
1. In a wide mouth thermos bottle having a vacuum filler, a protective jacket disposed about said filler and a liner conforming to the interior of said filler, the improvement comprising:
   a compound stopper including a hollow toroidal stopper having a central narrow opening therethrough removably engaging said liner at a top portion thereof for converting the thermos from a wide mouth opening to a relatively narrow opening, said hollow toroidal stopper being filled with insulation, and
   a narrow mouth stopper for sealing said narrow opening.
2. The thermos bottle according to claim 1 wherein said narrow mouth stopper containing thermal insulating material.
3. The thermos bottle of claim 2 wherein said thermal insulating material is powdered cork.
4. The thermos bottle of claim 1 wherein said toroidal stopper tapers inwardly and upwardly from the point of engagement with said liner to form said narrow mouth opening to the lined interior.
5. The thermos of claim 1 wherein said narrow mouth stopper removably engages said toroidal stopper for sealing said narrow mouth opening.

* * * * *